United States Patent [19]
Kanai

[11] Patent Number: 5,307,507
[45] Date of Patent: Apr. 26, 1994

[54] ANTENNA ARRANGEMENT SYSTEM CAPABLE OF REDUCING CO-CHANNEL INTERFERENCE

[75] Inventor: Toshihito Kanai, Tokyo, Japan

[73] Assignee: NEC Corporation, Tokyo, Japan

[21] Appl. No.: 636,864

[22] Filed: Dec. 28, 1990

[30] Foreign Application Priority Data

Dec. 28, 1989 [JP] Japan ................................ 1-340305
Dec. 28, 1989 [JP] Japan ................................ 1-340307
Apr. 27, 1990 [JP] Japan ................................ 2-114584
Apr. 27, 1990 [JP] Japan ................................ 2-114585
Jun. 11, 1990 [JP] Japan ................................ 2-152410

[51] Int. Cl.$^5$ ................................................. H04B 7/00
[52] U.S. Cl. ................................. 455/33.1; 455/56.1; 379/59
[58] Field of Search ............... 455/33.1, 33.3, 33.4, 455/34.1, 56.1; 379/59, 60

[56] References Cited

U.S. PATENT DOCUMENTS 4,759,051  7/1988  Han ........................................ 379/59
5,073,971 12/1991  Schaeffer .............................. 455/33

OTHER PUBLICATIONS

J. E. Stjernvall, "Calculation of Capacity and Co--Channel Interference in a Cellular System", Nordic Seminar on Digital Land Mobile Radio Communication, Feb. 1985, pp. 209-217.
G. Falciasecca et al, "Optimum Use of Radio Spectrum in ... According to Traffic Parameters", Second Nordic Seminar, Oct. 1986, pp. 301-306.
T. Kanai, "Exact Radio Link Design in Cellular Mobile Communication Systems", Autumnal Nat'l Conf. (1988) of the Institute of Electronics, Information, and Comm., vol. J71-B, No. 5, pp. 633-639.
M. Hata et al, "Radio Link Design of Cellular Land Mobile Communication Systems", IEEE Transactions on Vehicular Technology, vol. VT-31, No. 1, Feb. 1982, pp. 25-29.

Primary Examiner—Reinhard J. Eisenzopf
Assistant Examiner—Chi Pham
Attorney, Agent, or Firm—Sughrue, Mion, Zinn, Macpeak & Seas

[57] ABSTRACT

In an antenna arrangement system having a plurality of radio base stations each of which defines a cell approximated by a regular hexagon and divided into six sectors first and second ones of which are directed towards an angle of 0 degree with respect to an x-axis and towards an angle of 180 degrees, respectively, in an orthogonal coordinate system, first and second base stations are selected from the radio base stations to assign a common frequency channel to the first and the second sectors, respectively, and are located at first and second coordinate positions, respectively. The first and the second coordinate positions may be represented by ($\sqrt{3}$ Rni, 3Rj/2) and ($\sqrt{3}$ R(2ni−1)/2, 3Rj/2) where j takes an even number and an odd number, respectively, and R is representative of a real number, n, a natural number; i and j, integers. Alternatively, the first and the second coordinate positions may be represented by ($\sqrt{3}$ Rni, 3Rj/2) and ($\sqrt{3}$ R(3ni−3)/2, 3Rj/2) under the same conditions. The first and the second coordinate positions may not be restricted to the above-exemplified positions.

3 Claims, 15 Drawing Sheets

ANTENNA ARRANGEMENT SYSTEM CAPABLE OF REDUCING CO-CHANNEL INTERFERENCE

BACKGROUND OF THE INVENTION

This invention relates to an antenna arrangement system for use in a mobile communication system, such as a mobile telephone system, which has a service area assigned thereto.

In a conventional mobile communication system of the type described, a cellular system has been adopted 7hich divides a service area into a plurality of cells which may approximately be represented by regular hexagonal configurations, respectively, and in which a plurality of radio base stations are located at centers of the cells so as to cover the respective cells with the radio base stations. In such a cellular system, consideration is made about effective use of radio frequency channel. For this purpose, the same radio frequency channel is repeatedly assigned to or reused in the radio base stations which are spaced apart from one another so that no co-channel interference occurs among the radio base stations.

When the same frequency channel is repeatedly used or reused among the radio base stations, the radio base stations are divided into object base and interference base stations which suffer from the co-channel interference and bring about the co-channel interference into the object base stations, respectively.

Herein, let the radio base stations have omnidirectional antennae located at the centers of the cells, respectively, and be clustered into a plurality of groups each of which includes a prescribed number of the radio base stations to define the prescribed number of the cells. This shows that the prescribed number defines a cluster size or a repetition number of the cells in each cluster. In this event, an amount of the co-channel interference depends only on a distance between the object and the interference base stations. Under the circumstances, it is necessary to separate the object and the interference base stations from one another as long as possible in order to minimize the amount of co-channel interference with the cluster size kept invariable.

Specifically, maximum distances between the object and the interference base stations are obtained when six of the interference base stations are equidistantly located around the object base station, provided that each cell is approximated by the hexagonal configuration.

In an alternative antenna arrangement system, each of the cells is divided into a plurality of sectors with a single radio base station located at the center of each cell. This antenna arrangement system will be referred to as a sector type of the antenna arrangement system. In this case, each of the radio base stations has a plurality of directional antennae which can cover the respective sectors. The same or identical frequency channel is reused at every cluster size to provide a reuse pattern of the same frequency channel.

With this structure, it is possible to reduce a cell size as compared with the case where the omnidirectional antenna is located in each cell, as mentioned above. In addition, the same frequency channel may be arranged in the service area with a reduced distance between the object and the interference base stations by the use of directivity of the antennae arranged in each sector of the cells. This means that each frequency channel is effectively utilized in the sector type of the antenna arrangement system.

The reuse patterns in the sector type of the antenna arrangement system are classified into a parallel beam pattern system and a back to back beam pattern system. Description is made about the parallel beam pattern system in a paper which is contributed by J. E. Stjernvall to Nordic Seminar on Digital Land Mobile Radiocommunication held on Feb. 5–7, 1985, at Eapoo, Finland and which is entitled "CALCULATION OF CAPACITY AND CO-CHANNEL INTERFERENCE IN A CELLULAR SYSTEM". In such a parallel beam pattern system, the cells are approximated by regular hexagons or regular hexagonal configurations and groupled into clusters each of which has a cluster size composed of a predetermined number of the cells which may be equal to three, nine, twelve, twenty-one, or the like. For brevity of description, it is assumed that each cluster is composed of three cells and that first through third ones of the frequency channels are allocated to each cluster. In this event, the first frequency channels are directed through first predetermined sectors in a first direction identical with one another in the respective clusters. Similarly, the second frequency channels are directed through second predetermined sectors towards a second direction which is identical with one another in each of the clusters and which is different from the first direction. This applies to the third frequency channels. At any rate, the first through the third frequency channels are oriented in the same directions, respectively. This shows that each of the first through the third frequency channels is parallel to one another in the respective clusters. It is to be noted that sector distances among the first or the second sectors of the respective clusters are variable.

With this parallel beam pattern system, strong co-channel interferences take place between the same frequency channels in dependency upon a minimum one of the sector distances.

Alternatively, the back to back beam pattern system is disclosed by G. Falciasecca et al in a paper which is contributed to Second Nordic Seminar (October, 1986) and which is entitled "OPTIMUM USE OF RADIO SPECTRUM IN MOBILE RADIO SYSTEMS ACCORDING TO TRAFFIC PARAMETERS". According to the back to back beam pattern system, it is possible to reduce distances among object and interference base stations as compared with the parallel beam pattern system. However, consideration is made only about coexistence of the omnidirectional antennae and the directional antennae. In other words, such a back to back beam pattern system is locally adopted in a part of the service area wherein traffic is extremely congested. As a result, no consideration is made at all about adopting the back to back beam pattern system over a whole of the service area.

Thus, co-channel interference among the same frequency channels can not be sufficiently removed because directivity of antennae of each base station is effectively used in either the parallel beam pattern system or the back to back beam pattern system.

SUMMARY OF THE INVENTION

It is an object of this invention to provide an antenna arrangement system which is capable of reducing an amount of co-channel interference.

It is another object of this invention to provide an antenna arrangement system of the type described, which is effective when applied to a sector type of an antenna arrangement system.

An antenna arrangement system to which this invention is applicable is for use in a cellular system 7hich comprises a plurality of radio base stations dispersed in a service area which is defined by an orthogonal coordinate system having an x-axis and a y-axis orthogonal to the x-axis. The radio base stations have cells approximately specified by regular hexagonal configurations, respectively, and are located at x- and y-axis positions which are specified by i, j, and R, where i and j are integers determined in directions of the x- and the y-axes, respectively, and R is representative of a length of each side of the regular hexagonal configurations. The x- and the y-axis positions of the respective radio base stations are given by:

$$x = \sqrt{3}\ Ri,\ \text{(when } j \text{ is an even number) or}$$
$$\sqrt{3}\ R(2i - 1)/2\ \text{(when } j \text{ is an odd number), and}$$
$$y = 3Rj/2.$$

Each of the radio base stations has a selected set of directional antennae which is selected from a group consisting of a first set of six directional antennae and a second set of three directional antennae. The selected set of the directional antennae have different frequency channels assigned thereto and include a first antenna which has directivity directed towards an angle of 0 degree with respect to a positive direction of a selected one of the x- and the y-axes and a second antenna which has directivity directed towards an angle of 180 degrees with respect to the positive direction of the selected one of the x- and y-axes. According to this invention, the plurality of the radio base stations include first and second selected base stations which have first and second coordinate positions spaced apart from each other, which have sectors determined by the first and the second antennae directed towards the angles of 0 and 180 degrees opposite to each other, respectively, and which have a common one of the frequency channels that is assigned to the sectors determined by the first and the second antennae.

Description of the Preferred Embodiments

Figure 1:
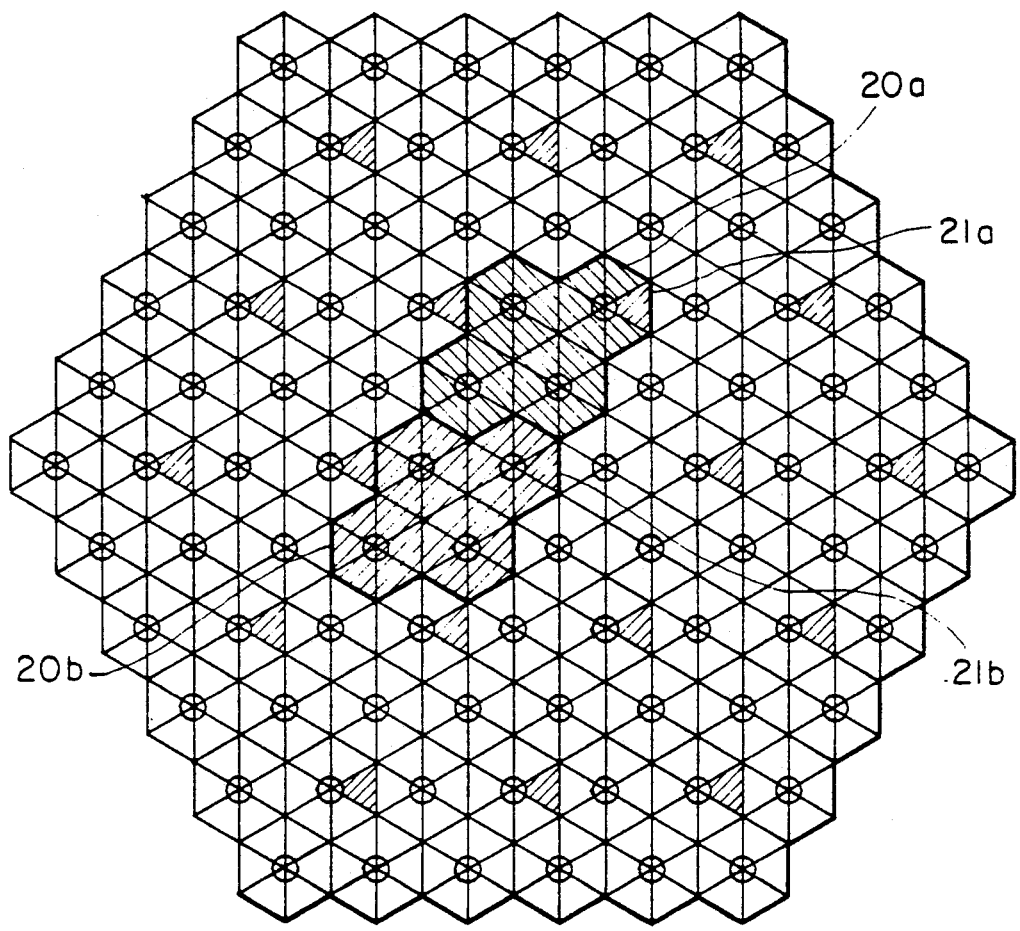
FIG. 1 is a schematic view for use in describing a conventional system which is known as a parallel beam pattern system.

Referring to FIG. 1, a conventional antenna arrangement system provides a parallel beam pattern system and comprises a plurality of radio base stations each of which is depicted at circles and which has a cell approximated by a hexagon or a hexagonal configuration around each radio base station. In the illustrated example, the cells are grouped into a plurality of clusters each of which is composed of four cells, as depicted at hatched portions 20a and 20b in FIG. 1, and which has a cluster size equal to four. In addition, each of the cells is divided into six sectors. Accordingly, it is readily understood that a repetition number of the sectors, namely, a repetition sector number is equal to twenty-four. In this connection, it is assumed that first through twenty-fourth frequency channels are assigned to each cluster 20a and 20b and are given to four of the radio base stations in each cluster. For brevity of description, the first frequency channel is assigned to a first one of the sectors in the first cluster 20 a that is depicted at 21a in FIG. 1. In this case, the first frequency channel is also assigned to a first one of the sectors in the second cluster 20b that is depicted at 21b. Similar relationships apply to the other clusters. At any rate, each frequency channel of the clusters is produced in parallel and therefore specified by a parallel beam, as understood from the first frequency channel represented by a hatched portion of each of the first and the second clusters 20a and 20b.

The illustrated parallel beam pattern system is disadvantageous, as pointed out in the premble of the instant specification.

Figure 2:
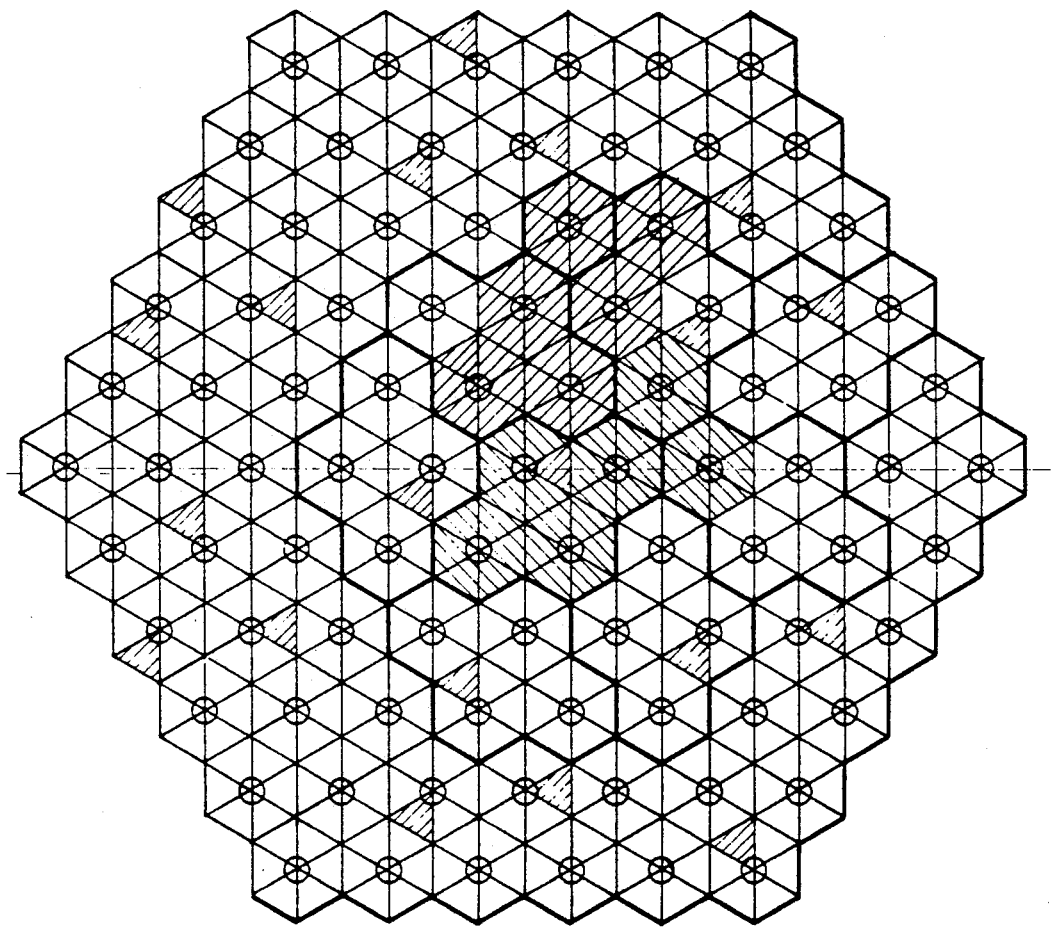
FIG. 2 is a similar view for use in describing another conventional system that is known as a back to back beam pattern system.

Referring to FIG. 2, another conventional antenna arrangement system is called a back to back beam pattern system and comprises a plurality of radio base stations. The illustrated conventional antenna arrangement system has also a cluster size equal to four and a repetition number of sectors equal to twenty-four, like in FIG. 1. In the example being illustrated, the same frequency channel is allocated to each cluster, as depicted at hatched triangular portions. It is to be noted that the hatched triangular portions are rotated by an angle of 120 degrees clockwise or counterclockwise in two adjacent ones of the clusters. The illustrated back to back beam pattern system is also disadvantageous, as pointed out in the preamble of the instant specification.

Figure 3:
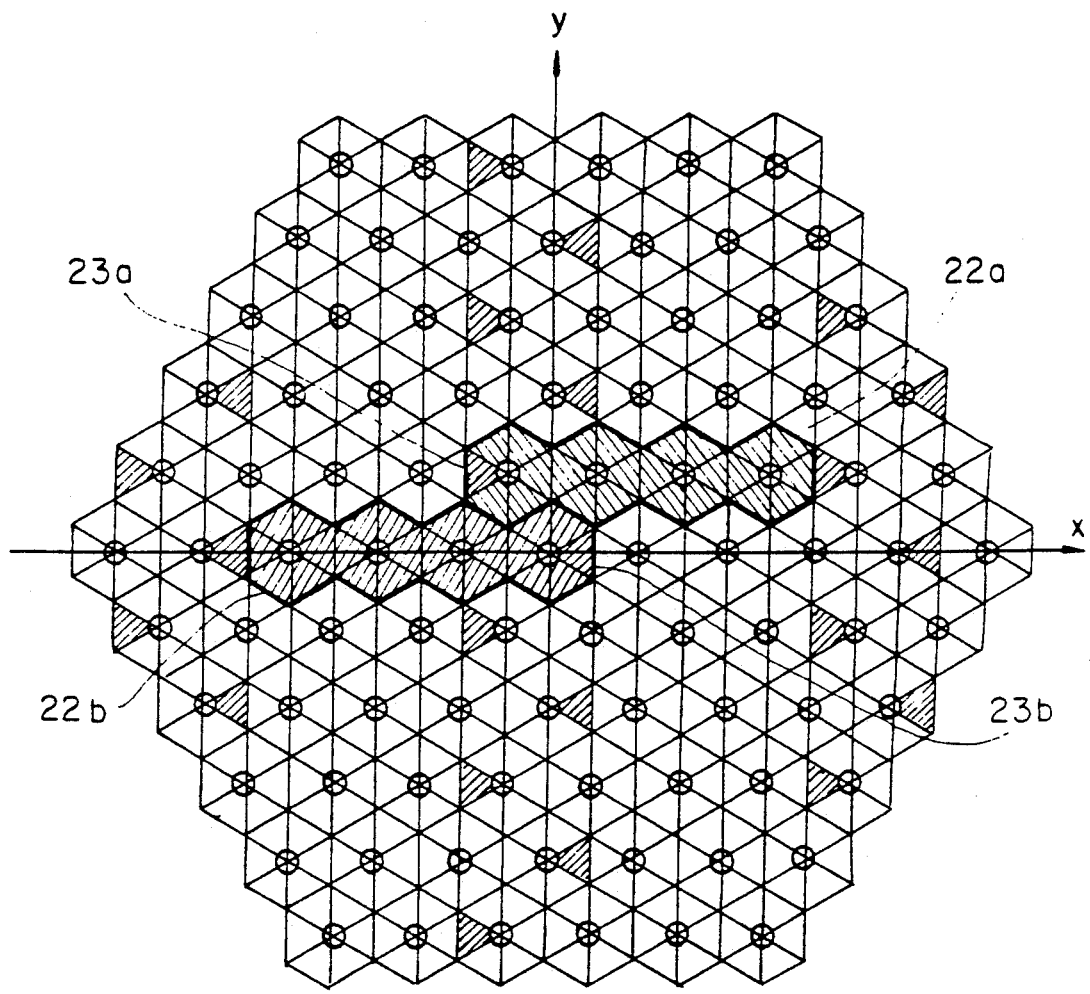
FIG. 3 is a schematic view for use in describing an antenna arrangement system according to a first embodiment of this invention.

Referring to FIG. 3, an antenna arragement system according to a first embodiment of this invention comprises a plurality of radio base stations grouped into a plurality of clusters each of which has four cells, like in FIGS. 1 and 2, as represented by first and second clusters 22a and 22b enclosed by thick lines. Each of the cells is approximately represented by a regular hexagonal shape or configuration and is divided into first through sixth sectors. The regular hexagonal shape has six sides equal to one another and depicted at R. In this connection, the repetition number of the sectors is equal to twenty-four in this embodiment like in FIGS. 1 and 2.

Herein, a whole of the service area is defined by an orthogonal coordinate system having an x-axis and a y-axis orthogonal to the x-axis. When the radio base stations are located at coordinate positions shown by circles in a manner illustrated in FIG. 3 and the x- and the y-axes are defined on the service area, as shown in FIG. 3, it is found out that the x-axis is divisible into a plurality of x-axis unit lengths each of which is equal to $\sqrt{3}\,R/2$ where R is representative of each length of the sides of the regular hexagonal shape while the y-axis is divisible into a plurality of y-axis unit lengths each of which is equal to $(\frac{1}{2})R$. Accordingly, the radio base stations on the x-axis are represented by the coordinate positions, such as (0, 0), ($\sqrt{3}\,R$, 0), ($2\sqrt{3}\,R$, 0), ($3\sqrt{3}$, 0), . . . On the other hand, the radio base stations on the y-axis are represented by the coordinate positions, such as (0, 0), (0, 3R), (0, 6R), and so on. In addition, the radio base stations on a line of $\sqrt{3}\,R/2$ on the x-axis take y-axis positions depicted at 3/2 R, (3/2+3)R, (3/2+6)R, $-3/2\,R$, $-(3/2+3)$, and so on. Therefore, the radio base stations on the $\sqrt{3}\,R/2$ line of the x-axis may be represented by ($\sqrt{3}\,R/2$, 3R/2), ($\sqrt{3}\,R/2$, $3R\times 3/2$), ($\sqrt{3}\,R/2$, $3R\times 5/2$), and so forth. Likewise, the radio base stations at a $\sqrt{3}\,R$ on the x-axis are represented by ($\sqrt{3}\,R$, 0), ($\sqrt{3}\,R$, 3R), ($\sqrt{3}\,R$, 6R), and so on. The y-axis positions 3R and 6R may be rewritten into $3\times 2/2$ and $3\times 4/2$, respectively.

From this fact, it is to be understood that the coordinate positions of the radio base stations are generally represented by ($\sqrt{3}\,Ri$, 3Rj/2) when j is an even number and by ($\sqrt{3}\,R(2i-1)/2$, 3Rj/2) when j is an odd number.

In FIG. 3, each of the radio base stations has first through sixth directional antennae which exhibit maximum radiation directivity in directions of 0, 60, 120, 180, 240, and 360 degrees with respect to a position direction of the x-axis and which provide different frequency channels. Thus, each of the clusters has first through twenty-fourth frequency channels assigned thereto and sent through the respective sectors of each cluster. It is assumed that only the first frequency channels are drawn in the respective clusters by the hatched triangular portions. In FIG. 3, the first frequency channels of the first and the second clusters 22a and 22b are indicated by 23a and 23b, respectively.

Specifically, the first frequency channel 23a is assigned to the fourth sector of the left most cell in the first cluster 22a. This means that the first frequency channel 23a in the first cluster 22a is given to the fourth directional antenna directed to 180 degrees with respect to the x-axis. On the other hand, the first frequency channel 23b in the second cluster 22b is assigned to the first sector of the rightmost cell in the second cluster 22b. Therefore, the first frequency channel 23b in the second cluster 22b is given to the first directional antenna directed to 0 degree with respect to the x-axis. Similar relationships apply to the remaining clusters and frequency channels.

In addition, the coordinate positions of the radio base stations for the first frequency channels 23a and 23b in the first and the second clusters 22a and 22b are represented by ($-\sqrt{3}\,R/2$, 3R/2) and (0, 0).

As is apparent from FIG. 3, the coordinate positions of the radio base stations for the first directional antennae directed to 0 degree with respect to the x-axis are generally represented by ($\sqrt{3}\,Rnk$, 3Rj/2) where j takes an even number; n, a natural number; and k, an integer, while the coordinate positions of the radio base stations for the first directional antennae directed to 180 degrees with respect to the x-axis are represented by ($\sqrt{3}\,R(2nk-1)/2$, 3Rj/2) where j takes an odd number.

With this structure, a distance between the radio base stations for the first directional antennae 23a and 23b is equal to $\sqrt{3}\,R$ and gives a minimum distance of the sectors to which the same frequency channel is assigned. However, it is possible to make the co-channel interference between the sectors extremely small because each directivity of the first directional antennae 23a and 23b is directed towards directions opposite to each other. Moreover, a distance between object and interference base stations becomes equal to $\sqrt{3}\,Rn$ in the direction of the maximum directivity of each antenna. Therefore, it is possible to suppress the co-channel interference between the object and the interference base stations by increasing the number of n. In the example illustrated in FIG. 3, the number n is equal to four.

Figure 4:
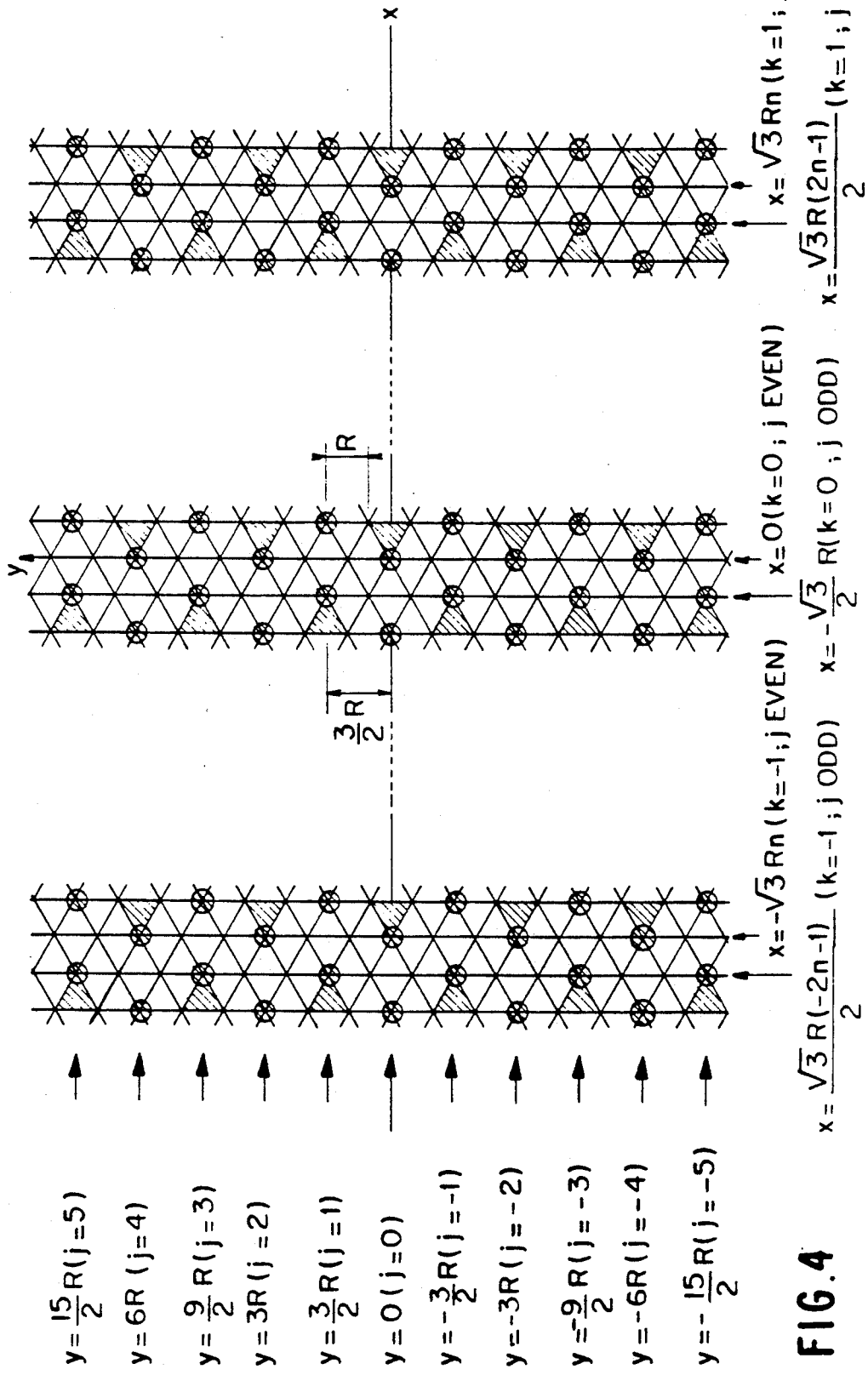
FIG. 4 is a view for use in describing a principle of the antenna arrangement system illustrated in FIG. 3.

Referring to FIG. 4, the antenna arrangement system illustrated in FIG. 3 will be described more in detail. In FIG. 4, the x- and the y-axes are illustrated like in FIG. 3. The y-axis positions along the y-axis are specified by 0, 3R/2, 3R, 9R/2, 6R, 15R/2, $-3R/2$, $-3R$, $-9R/2$, $-6R$, $-15R/2$ all of which are determined in relation to the number of j. Likewise, the x-axis positions along the x-axis are specified by $\sqrt{3}\,Rnk$ and $\sqrt{3}\,(2nk-1)$. When the x-axis positions are represented by $\sqrt{3}\,Rnk$ and $\sqrt{3}(2nk-1)$, the radio base stations are located at the y-axis positions 3Rj/2 specified by the even and the odd numbers of j, respectively.

Figure 5:
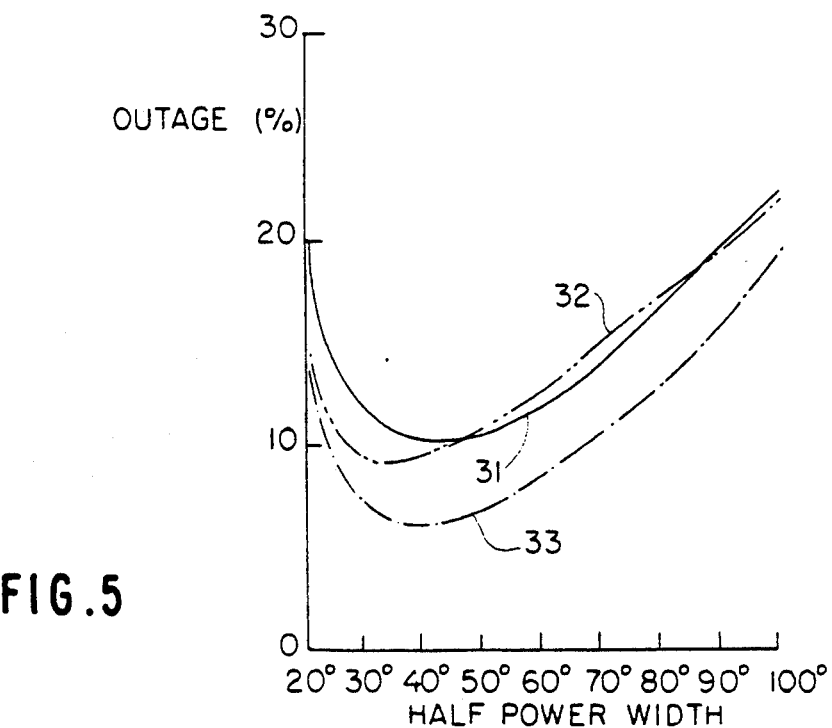
FIG. 5 is a graphical representation for use in describing characteristics according to the conventional systems and the antenna arrangement system illustrated in FIG. 3.

Referring to FIG. 5, wherein an abscissa and an ordinate represent a half power width (shown by angles)

and an outage (%), respectively, curves 31, 32, and 33 exhibit characteristics illustrated in FIGS. 1, 2, and 3, respectively, Each outage is represented by percent possibility which can not accomplish a desired quality by co-channel interference and thermal noise. Such an outage can be calculated by integrating, within a range of undesired quality, a probability density function given by a combination of a carrier-to-noise ratio (CNR) and a carrier-to-interference ratio (CIR) which are obtained in each sector. In FIG. 5, the outages are varied relative to the half power width when a long-term mean CNR is defined along a boundary of each cell in a direction of a maximum gain of each antenna and is set into 25 dB. Such calculations of outages are known in a paper contributed by the present inventor to Autumnal National Conference (1989) of the Institute of Electronics, Information, and Communication, Vol. J71-B, No. 5, pages 633-639, and entitled "An effect of antenna radiation pattern in sector cellular systems". Therefore, the calculations of the outages will not be described any longer.

Specifically, each outage has been at first given on the basis of patterns measured within the half power width of 60 degrees and the other outages within other half power widths have been calculated by varying the directivity. In addition, when a factor C/(N+I) is smaller than 14 dB, it is judged in the example that an outage takes place. In this event, a propagation model is used wherein a distance attenuation constant $\alpha$ of long-term center values is equal to 3.5. In addition, it is assumed that short-term center values of each desired and interference waves are independently varied in accordance with logarithmic normal distribution curves of a standard deviation $\delta = 6.0$ dB.

At any rate, the antenna arrangement system according to this invention has a reduced outage, as shown by the curve 33, in comparision with the parallel beam pattern system and the back to back beam pattern system specified by the curves 31 and 32, respectively. This means that an amount of co-channel interference in this invention is smaller than those illustrated in FIGS. 1 and 2. For example, when the half power width is equal to 60 degrees, the outage of the parallel beam pattern system reaches 11.8% while the outage of this invention is as small as 8.5%. This means that the outage of this invention is equal to or smaller than three quarter of the parallel beam pattern system.

In addition, the amount of the co-channel interference can be also evaluated by a cumulative distribution of a local mean CIR within each sector. Such a cumulative distribution can be calculated by integrating a probability density function of a short-term mean CIR. Such calculation of a cumulative distribution is described in an article which is contributed by M. Hata et al to IEEE Trans. on V.T., Vol. VT-31, No. 1, February 1982, pages 28-29 and which is entitled "Radio Link Design of Cellular Land Mobile Communication Systems". Accordingly, no description will be made about the calculation of the cumulative distribution of the local mean CIR any longer.

Herein, it is assumed that a directional antenna which has a half power width of 60 degrees is used in each radio base station of the parallel beam pattern system illustrated in FIG. 1. Likewise, a directional antenna which has a half power width of 60 degrees is used in each radio base station of the antenna arrangement system illustrated in FIGS. 3 and 4. In this case, the propagation model is identical with that described in conjunction with FIG. 5.

Figure 6:
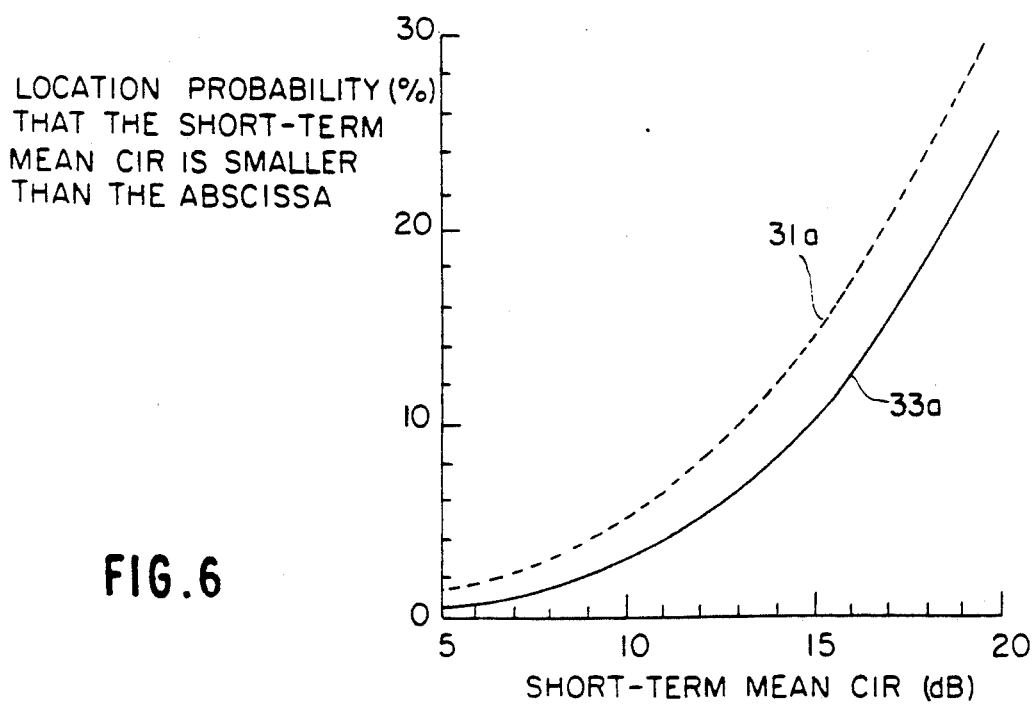
FIG. 6 is another graphical representation for use in describing another characteristic according to the conventional system and the antenna arrangement system of the invention.

Referring to FIG. 6, wherein an abscissa and an ordinate represent a short-term mean CIR (dB) and location probability (%) such that the local mean probability becomes smaller than the abscissa, respectively, curves 31a and 33a represent cumulative distributions of the short-term mean CIR that are obtained from the systems illustrated in FIGS. 1 and 3, respectively. When the curves 31a and 33a are compared with each other, the location probability of this invention is considerably improved in comparison with that of the parallel beam pattern system illustrated in FIG. 1. Practically, the short-term mean CIR of this invention is reduced by 2.4 dB at the location probability of 10% as compared with the parallel beam pattern system, as readily understood from the curves 31a and 33a.

Figure 7:
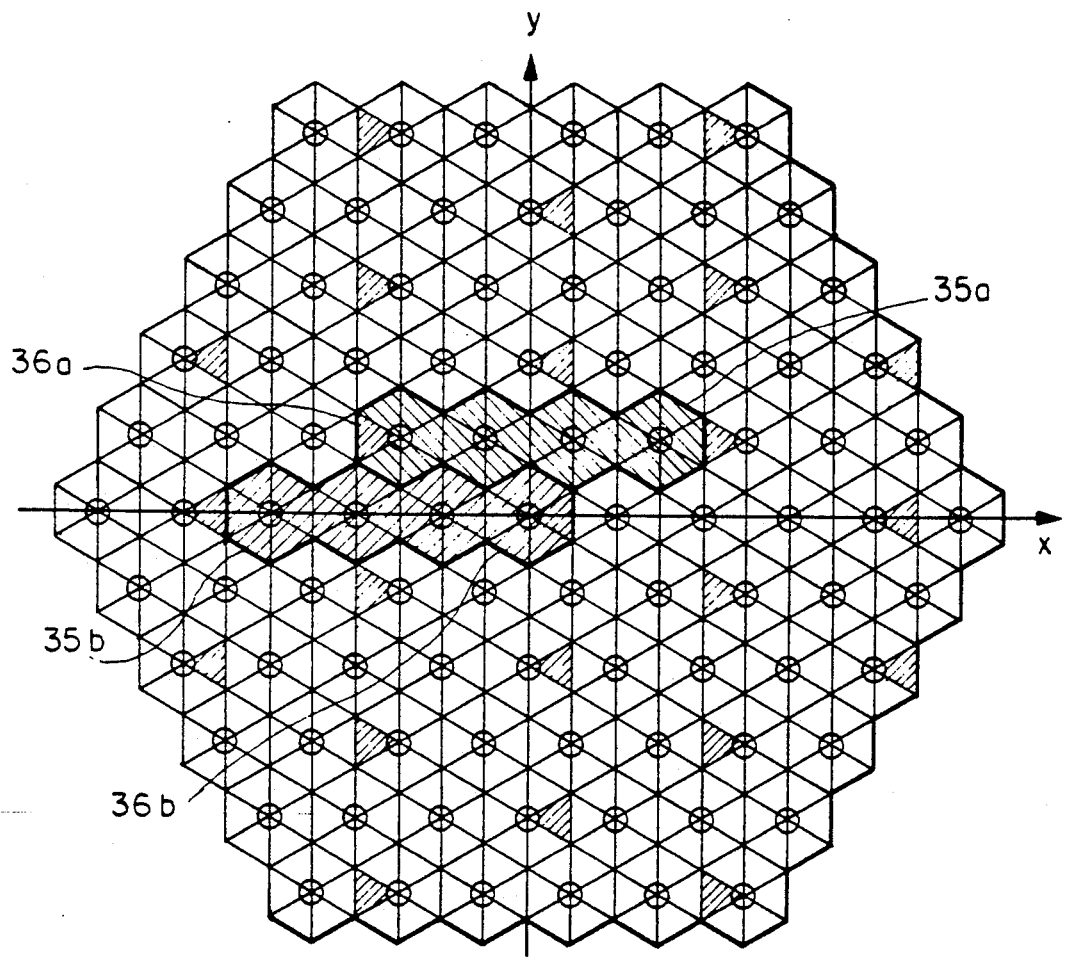
FIG. 7 is a schematic view for use in describing an antenna arrangement system according to a second embodiment of this invention.
Figure 8:
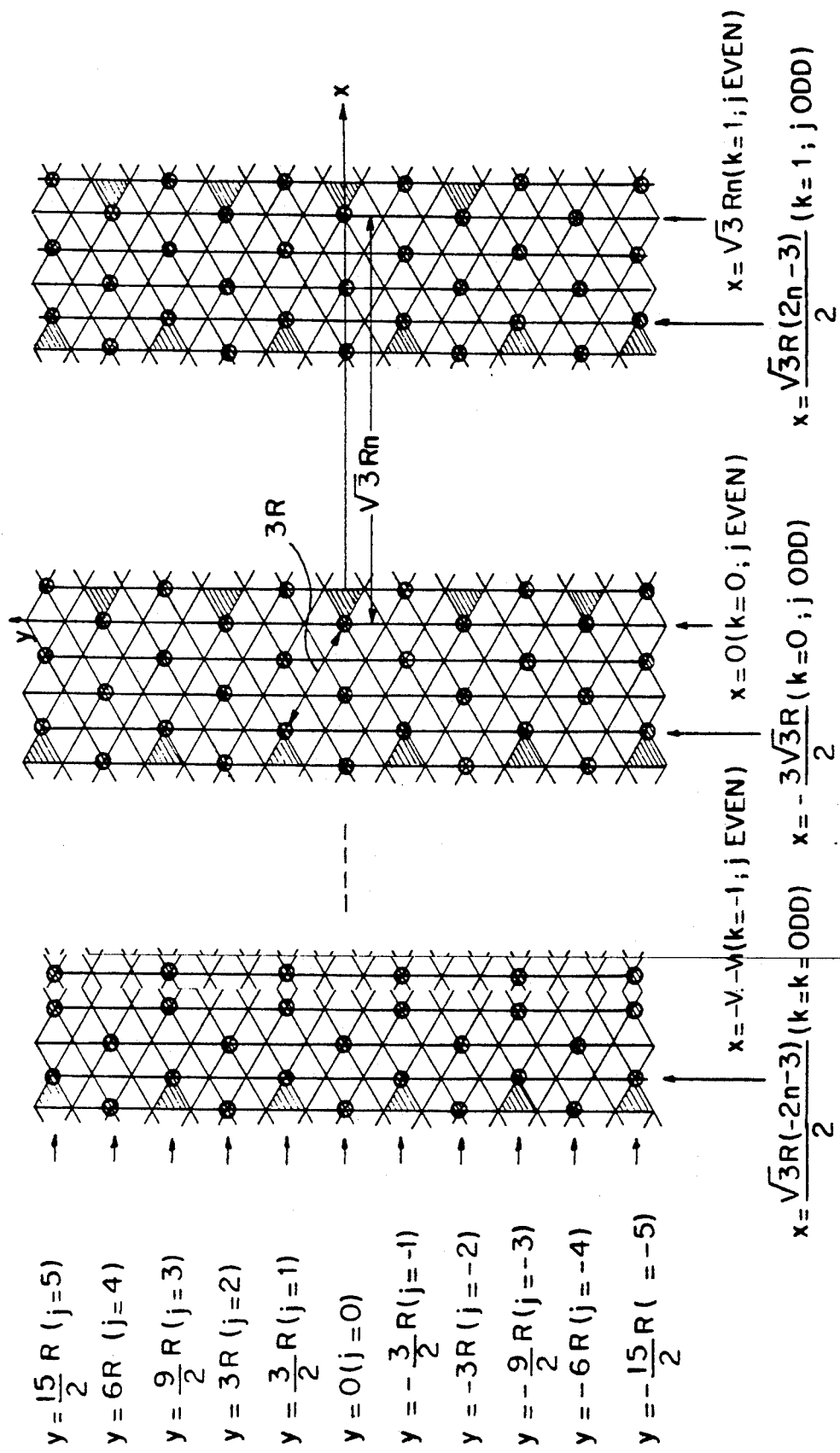
FIG. 8 is a view for use in describing a principle of the antenna arrangement system illustrated in FIG. 7.

Referring to FIGS. 7 and 8, an antenna arrangement system according to a second embodiment of this invention is similar in structure to that illustrated in FIGS. 3 and 4 except that combinations of clusters and hatched sectors for first and second ones 35a and 35b of the clusters are different from those illustrated in FIGS. 3 and 4. Specifically, the first cluster 35a of FIG. 7 is equivalent to the first cluster 22a shifted leftwards of FIG. 3. When first frequency channels 36a and 36b are assumed to be assigned to the hatched sectors, the first frequency channel 36a of the first cluster 35a is allocated to the fourth sector and directed in the direction of 180 degrees with respect to the positive direction of the x-axis while the first frequency channel 36b of the second cluster 35b is allocated to the first sector and directed in the direction of 0 degree with respect to the positive direction of the x-axis. Thus, the first frequency channels of the first and the second clusters 35a and 35b are directed in opposite directions, as illustrated in FIG. 7. This applies to the other frequency channels.

In FIG. 8, the coordinate positions of the sectors having the antennae directed to the angle of 0 degree are generally represented by ($\sqrt{3}$ Rnk, 3Rj/2) where j takes an even number while the coordinate positions of the sectors having the antennae directed to the angle of 180 degrees are generally represented by ($\sqrt{3}$ R(2nk−3), 3Rj/2) where j takes an odd number. As apparent from FIGS. 7 and 8, it is found out that a minimum distance between the radio base stations to which the same frequency channel is assigned is equal to 3R and may be called a co-channel reuse distance hereinafter. In addition, a distance between object and interference base stations is equal to $\sqrt{3}$ Rn in the maximum gain direction of the antennae, like in FIG. 3.

Figure 9:
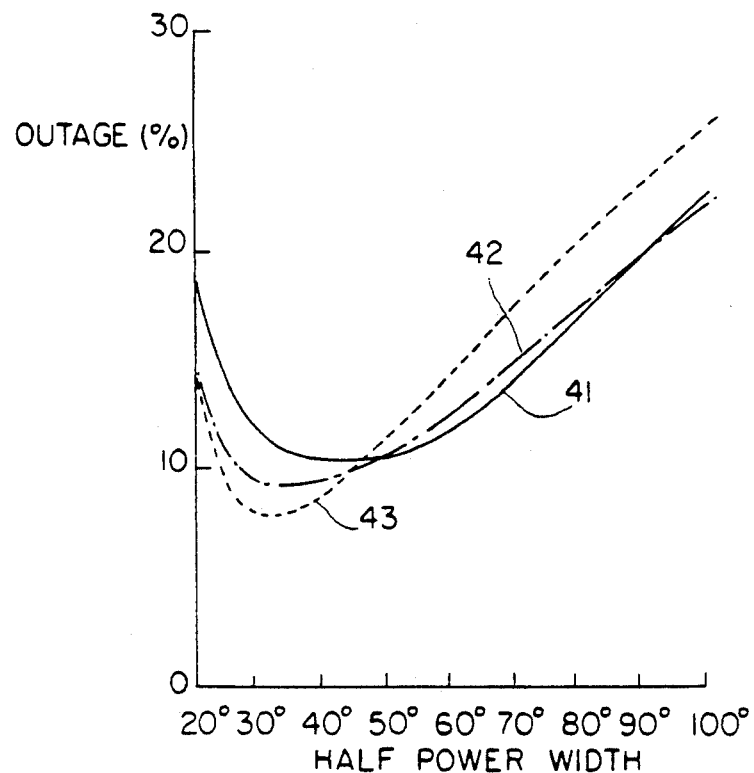
FIG. 9 is a graphical representation for use in describing characteristics according to the conventional systems and the antenna arrangement system illustrated in FIG. 7.

Referring to FIG. 9, curves 41, 42, and 43 show characteristics which are similar to those illustrated in FIG. 5 and which have been obtained by the same conditions as FIG. 5. In FIG. 9, the curves 41, 42, and 43 represent the characteristics of the parallel beam pattern system, the back to back beam pattern system, and the antenna arrangement system according to the second embodiment of this invention, respectively. As readily understood from the curve 43 in FIG. 9, the antenna arrangement system exhibits the characteristic which is excellent as compared with the characteristics shown by the curves 41 and 42 when the antennae have the half power widths smaller than 45 degrees. This shows that the co-channel interference can be reduced in the antenna arrangement system of this invention. For example, when the antennae have the half power width of 30 degrees, the outage of the parallel beam pattern system specified by the curve 41 is equal to 11.8% while the outage of this invention is as small as 7.8%. Thus, the outage of this invention is reduced to about two third of the outage of the parallel beam pattern system.

Figure 10:
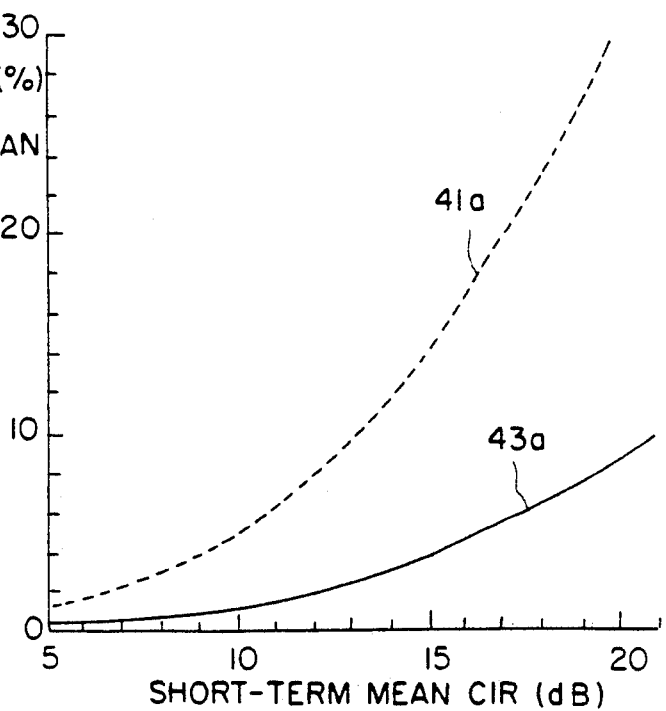
FIG. 10 is another graphical representation for use in describing the conventional system and the antenna arrangement system according to the second embodiment of this invention.

Referring to FIG. 10, curves 41a and 43a represent characteristics of the parallel beam pattern system and the antenna arrangement system illustrated in FIGS. 7 and 8 and are similar to the curves 31a and 33a of FIG. 6, respectively. As shown in FIG. 10, the antenna arrangement system according to the second embodiment of this invention can also improve the short-term mean CIR in comparison with the parallel beam pattern system, like in the first embodiment of this invention.

Figure 11:
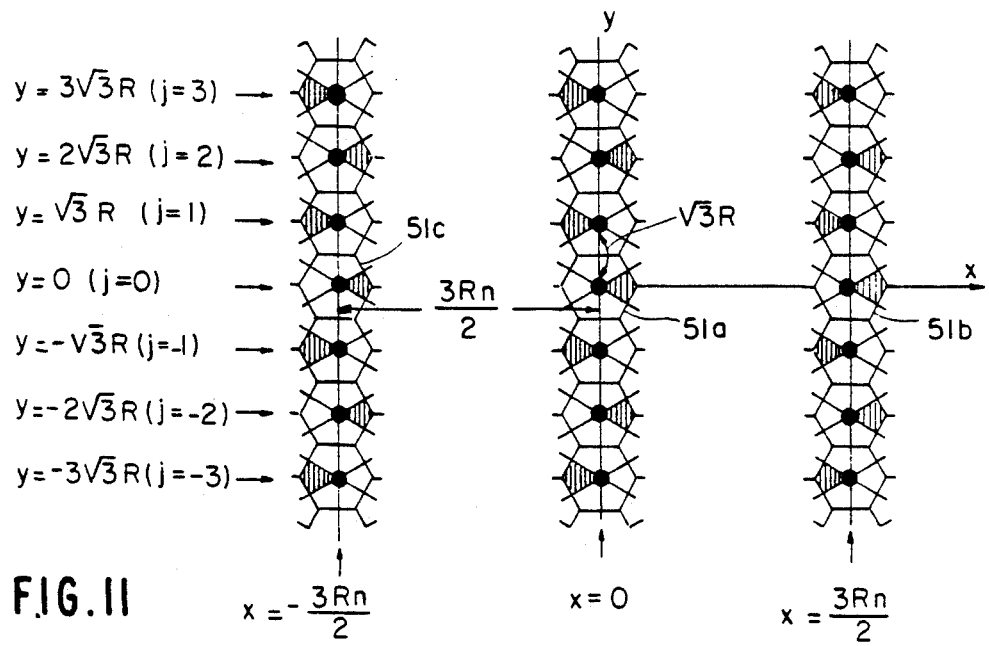
FIG. 11 is a schematic view for use in describing a principle of an antenna arrangement system according to a third embodiment of this invention.
Figure 12:
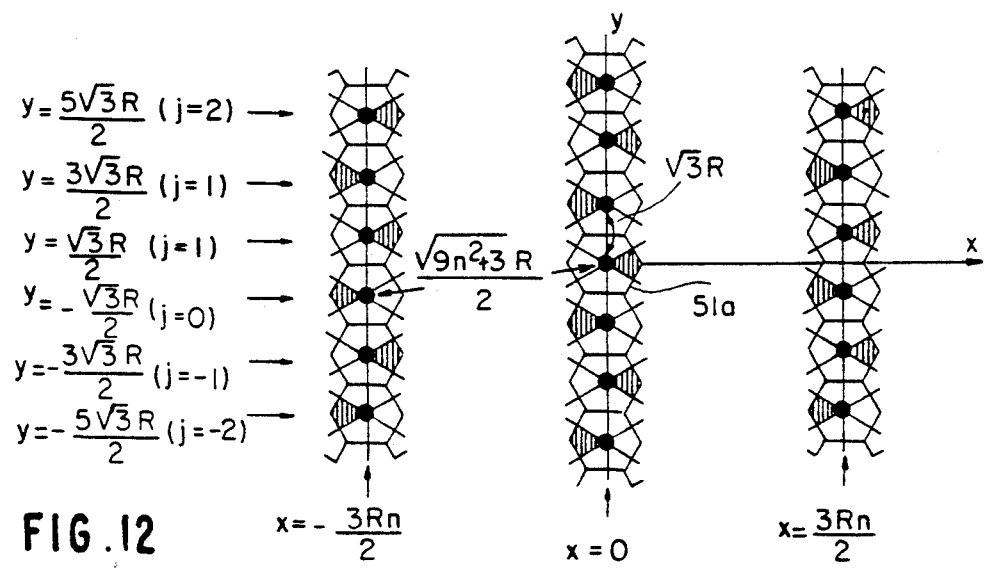
FIG. 12 is a similar view for use in describing another principle of the antenna arrangement system according to the third embodiment of this invention.

Referring to FIGS. 11 and 12, description will be made about principles of an antenna arrangement system according to a third embodiment of this invention. In FIGS. 11 and 12, a plurality of radio base stations depicted at dots are arranged on an orthogonal coordinate defined by an x- and a y-axis and have cells approximated by regular hexagonal configurations each of which has six apices and six side lines equal in length to one another and specified by R, like in FIGS. 3 and 7. The first through the sixth sectors are numbered counterclockwise from the first sector through which the x-axis passes, like in FIGS. 3 and 7. Herein, it is to be noted that each cell is divided into first through sixth sectors in a manner different from FIGS. 3 and 7. Specifically, each of the first through the sixth sectors is formed within an angle of 60 degrees so that a single one of the apices is included in each sector, as illustrated in FIGS. 11 and 12. Therefore, each sector has an angular shape and may be called an angular shaped sector hereinafter.

In FIGS. 11 and 12, central, righthand side, and lefthand side columns of the cells are laterally arranged with the remaining cells between two adjacent ones of the columns omitted therefrom. This is because the remaining cells may be left out of consideration, as will become clear later as the description proceeds. A distance between two adjacent ones of the columns is defined by the length R of each side line and the number n representative of the number of cells laid between the two adjacent columns. In FIGS. 11 and 12, the number n is equal to an even number and an odd number, respectively. In this connection, distances between two adjacent columns are represented by $3Rn/2$ and $\sqrt{(9n^2+3)}\,R/2$ in FIGS. 11 and 12, respectively.

As illustrated in FIG. 11, the x-axis is extended from a first reference cell (depicted at 51a) of the central column towards a second reference cell 51b in a position direction and extended towards a third reference cell 51c of the lefthand side column in a negative direction. The y-axis is extended through the central column of the cells, as illustrated in FIG. 11. As is apparent from FIG. 11, a distance between two adjacent ones of the radio base stations is equal to $\sqrt{3}\,R$ in the y-axis direction.

Under the circumstances, the radio base stations 7hich are located along even-numbered columns have coordinate positions generally represented along the x-and the y-axes by $(3\,Ri/2, \sqrt{3}\,Rj)$ where i is an even number and j is an integer. On the other hand, the radio base stations which are located along odd-numbered columns have coordinate positions generally represented by $(3\,Ri/2, \sqrt{3}\,R(2j-1))/2$ where i is an odd number.

It is to be noted that an identical frequency channel is assigned to black-painted ones of the angular shaped sectors illustrated in FIG. 11 and may be referred to as a first frequency channel. The black-painted angular shaped sectors are classified into a first group of the angular shaped sectors directed to an angle of 0 degree and a second group of the angular shaped sectors directed to an angle of 180 degrees. The &irst group of the angular shaped sectors in the central column is represented by the coordinate positions $(0, 2\sqrt{3}\,Rj)$ where j is an integer while the second group of the angular shaped sectors in the central column is represented by the coordinate positions $(0, \sqrt{3}\,R(2j-1))$, as showing in FIG. 11. Likewise, the first group of the black-painted angular shaped sectors in the righthand side column is represented by $(3\,Rn/2, 2\sqrt{3}\,Rj)$ while the second group in the righthand side column is represented by $(3\,Rn/2, \sqrt{3}\,R(2j-1))$. Similarly, the first and the second groups in the lefthand side column are specified by the coordinate positions $(-3\,Rn/2, 2\sqrt{3}\,Rj)$ and $(-3\,Rn/2, \sqrt{3}\,R(2j-1))$, respectively.

In FIG. 11, a primary minimum distance between the radio base stations which have the black-painted angular shaped sectors is equal to $\sqrt{3}\,R$ and is given by a distance measured along the y-axis as shown in the central column. Such a primary minimum distance may be called a reuse distance because the identical frequency channel is allocated to and reused in the radio base stations adjacent to each other along the y-axis. However, antenna directivity of the radio base station is opposite to antenna directivity of the adjacent radio base station remote from the former radio base station by $\sqrt{3}\,R$. Accordingly, co-channel interference can be minimized in the illustrated antenna arrangement system. In addition, since a subsidiary minimum distance along the x-axis is represented by $3\,Rn/2$, co-channel interference along the y-axis is also extremely reduced as the number n increases.

Referring back to FIG. 12, the x-axis is extended through the first sector of a reference cell 51a in the central column towards the righthand side column of the cells in the positive direction and extended through the fourth sector of the reference cell 51a towards the lefthand side column in the negative direction. When the number n is an odd number, each of the righthand and the lefthand side column is shifted by $\sqrt{3}\,R/2$ relative to the central column. As is readily understood, the first group of the black-painted angular shaped sectors in the center column is represented by the coordinate positions $(0, 2\sqrt{3}\,Rj)$ while the second group of the black-painted angular shaped sectors in the center column is represented by the coordinate positions $(0, \sqrt{3}\,R(2j-1))$. As regards the righthand and the lefthand side columns, the first and the second groups of the black-painted angular shaped sectors are specified by coordinate positions shifted along the y-axis by $\sqrt{3}\,Rj/2$, as shown in FIG. 12. Accordingly, the first and the second groups of each of the righthand and the lefthand side columns may be specified by coordinate positions similar to those of the center column.

With this arrangement system, a primary minimum distance along the y-axis is equal to that illustrated in FIG. 11 while a subsidiary minimum distance in the direction of the x-axis is represented by $\sqrt{(9n^2+3)}\,R/2$.

Figure 13:
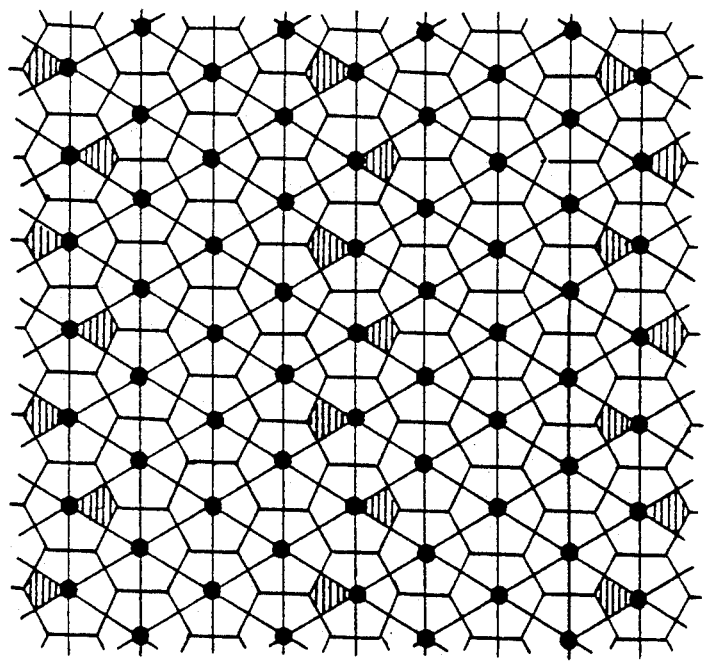
FIG. 13 is a schematic view of the antenna arrangement system according to the third embodiment of this invention.

Referring to FIG. 13, the antenna arrangement system according to the third embodiment of this invention is structured by the use of the principle illustrated in FIG. 11. In this arrangement system, the number n is equal to four and a repetition sector number is equal to twenty-four. This shows that each cluster is composed of four and that different frequency channels of twenty-four are necessary at minimum so as to cover a whole of the service area.

Figure 14:
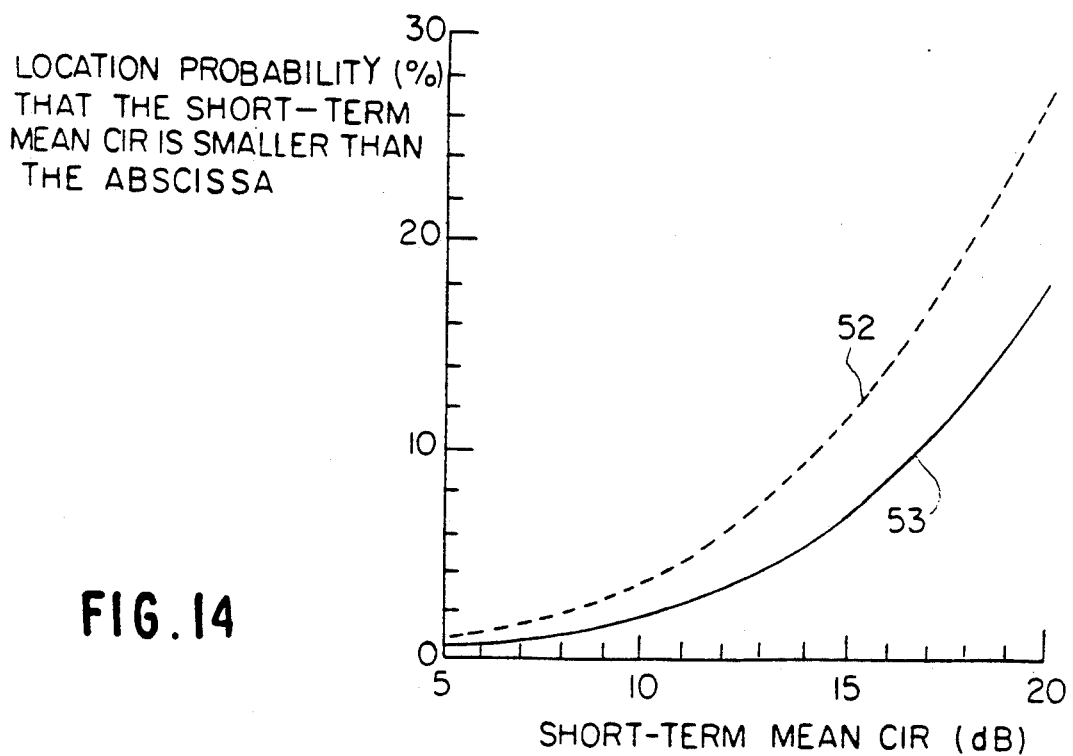
FIG. 14 is a graphical representation for use in describing characteristics according to the conventional system and the antenna arrangement system illustrated in FIG. 13.

Referring to FIG. 14, curves 52 and 53 show characteristics of the parallel beam pattern system illustrated in FIG. 1 and the antenna arrangement system illustrated in FIG. 13, respectively. The illustrated characteristics are specified by short-term mean CIR's and calculated in the manner mentioned in conjunction with FIG. 6. When the curve 53 of this invention is compared with the curve 52 of the parallel beam pattern system, it is found out that the short-term mean CIR of this invention is improved by about 2.4 dB at the location probability of 10% in comparison with that of the parallel beam pattern system.

Figure 15:
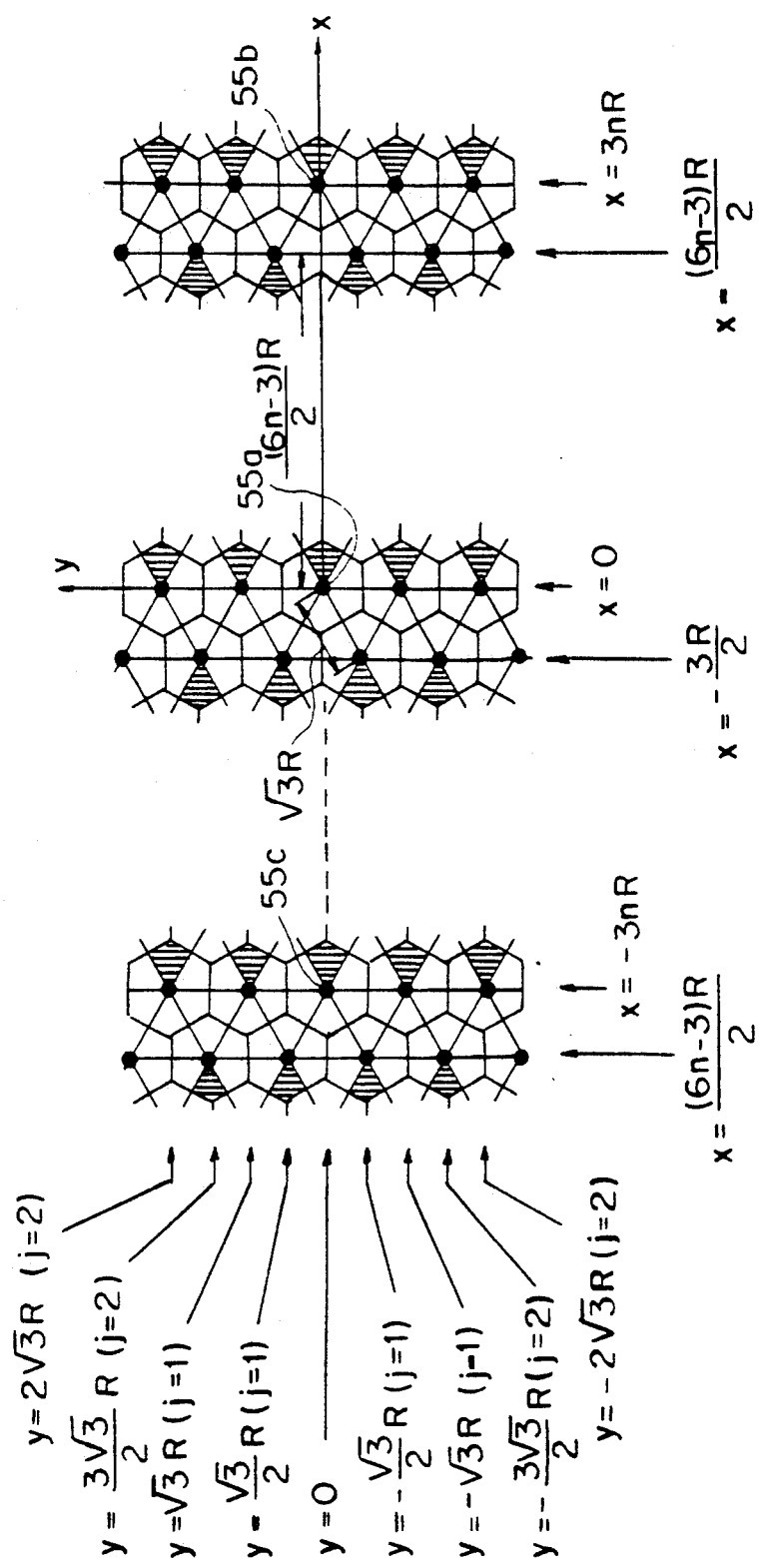
FIG. 15 is a schematic view of a principle of an antenna arrangement system according to a fourth embodiment of this invention.

Referring to FIG. 15, description will be made about a principle of an antenna arrangement system used for a fourth embodiment of this invention. In FIG. 15, it is assumed that cells and sectors are arranged in a manner similar to those illustrated in FIGS. 11 and 12. Like in FIGS. 11 and 12, an orthogonal coordinate is defined in a service area and has a reference radio base station 55a as an origin and an x-axis and a y-axis extended from the origin horizontally and vertically of FIG. 15. Specifically, the x-axis is extended from the reference base station 55a towards another base station 55b located in a rightmost column of the cells in a positive direction and is also extended in a negative direction from the reference base station 55a towards an additional base station 55c located in a lefthand side column of FIG. 15. In addition, only three pairs of columns are illustrated with the remaining columns omitted from FIG. 15 for brevity of description. Each column is formed along the y-axis around the radio base stations depicted at dots, such as 55a, 55b, and 55c. A reference one of the columns of cells defines the y-axis extended along the base stations, as illustrated in FIG. 15.

Each pair of the columns is composed of a righthand side column and a lefthand side column, such as 0 and $3R/2$; $3nR$ and $(6n-3)R/2$; $-3nR$ and $-(6n-3)R/2$, along the x-axis. In the example being illustrated, one of the righthand side columns is determined as the reference column. Under the circumstances, an identical frequency channel is assigned to black-painted angular shaped sectors. In other words, the identical frequency channel is reused in the black-painted angular shaped sectors in FIG. 15. More particularly, the black-painted angular shaped sectors of the righthand side columns form first sectors, respectively, and are directed rightwards of the x-axis, namely, to an angle of 0 degree. Such black-painted angular shaped sectors of the righthand side columns will be simply called first sectors hereinafter. On the other hand, the black-painted angular shaped sectors of the lefthand side columns form fourth sectors and are directed leftwards of the x-axis, namely, to an angle of 180 degrees. They may be called fourth sectors. A distance between two adjacent pairs of the columns is equal to $(6n-3)R/2$, as shown in FIG. 15. At any rate, the first and the second sectors are given by directional antennae included in the radio base stations.

As readily understood from FIG. 15, the radio base stations which form the first sectors are located at x- and y-axis positions given by $(3nR, \sqrt{3}\,Rj)$ while the radio base stations which form the fourth sectors are located at x- and y-axis positions given by $(6nR-3)R/2$, $\sqrt{3}\,(2j-1)/2$, where n is an integer.

With this structure, a minimum reuse distance is given by a distance between the radio base stations which are adjacent to each other along the y-axis and which are included in the righthand and the lefthand side columns of each pair. At any event, the minimum reuse distance is equal to $\sqrt{3}\,R$. Another minimum distance is equal to $(6n-3)R/2$ in a maximum gain direction of each antenna.

Figure 16:
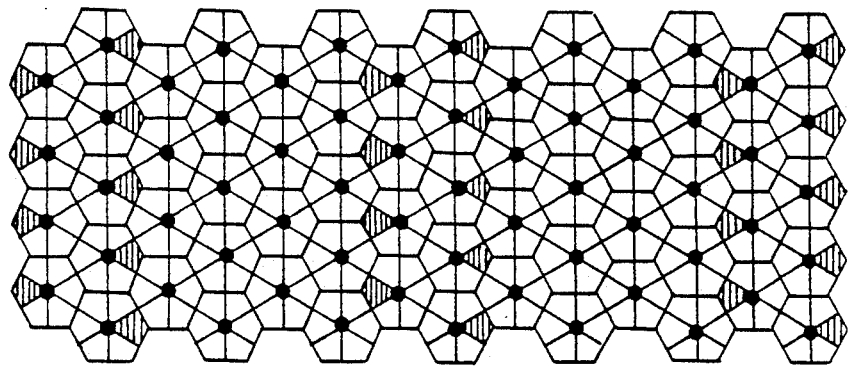
FIG. 16 is a schematic view of the antenna arrangement system according to the fourth embodiment of this invention.

Referring to FIG. 16, the antenna arrangement system according to the fourth embodiment of this invention is structured by the use of the principle mentioned in conjunction with FIG. 15. In FIG. 16, the number n and a repetition sector number are equal to three and eighteen. Like in FIG. 15, an identical frequency channel is allocated to the black-painted angular shaped sectors which can be specified by coordinate positions, namely, x- and y-axis positions mentioned in conjunction with FIG. 15. Inasmuch as the repetition sector number is equal to eighteen, eighteen different frequency channels are necessary at minimum for covering a whole of the service area. It has been confirmed that co-channel interference is improved in the illustrated antenna arrangement system also.

Figure 17:
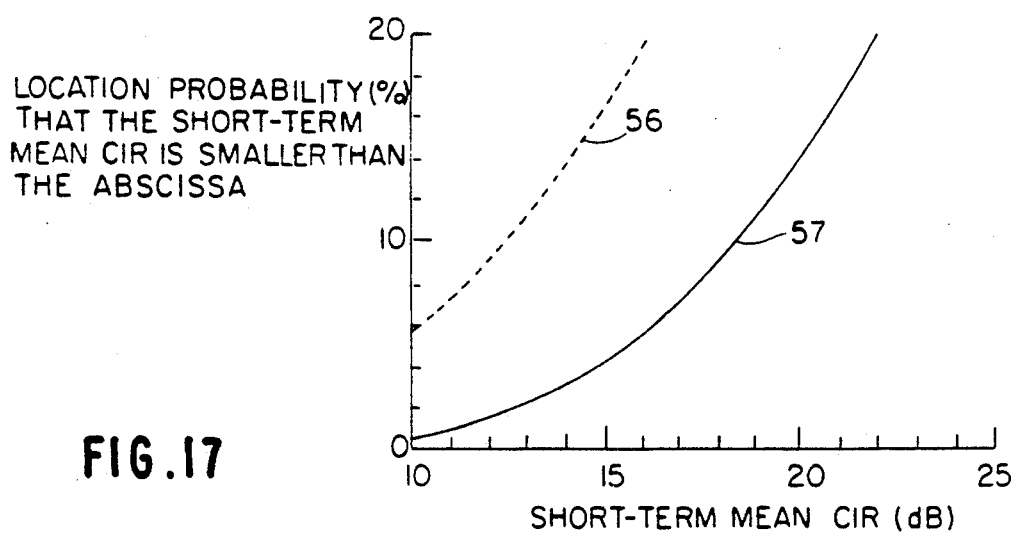
FIG. 17 is a graphical representation of the characteristics according to the conventional system and the antenna arrangement system illustrated in FIG. 16.

Referring to FIG. 17, curves 56 and 57 show characteristics of the parallel beam pattern system and the antenna arrangement system according to the fourth embodiment of this invention, respectively. The illustrated characteristics are specified by the short-term mean CIR's obtained in the manner mentioned with reference to FIG. 14. In fact, when the location probability is equal to 10%, the short-term mean CIR is improved by about 6 dB in the antenna arrangement system according to the fourth embodiment illustrated in FIG. 16. As a result, the antenna arrangement system enables a reduction of co-channel interference in comparison with the conventional parallel beam pattern system.

Figure 18:
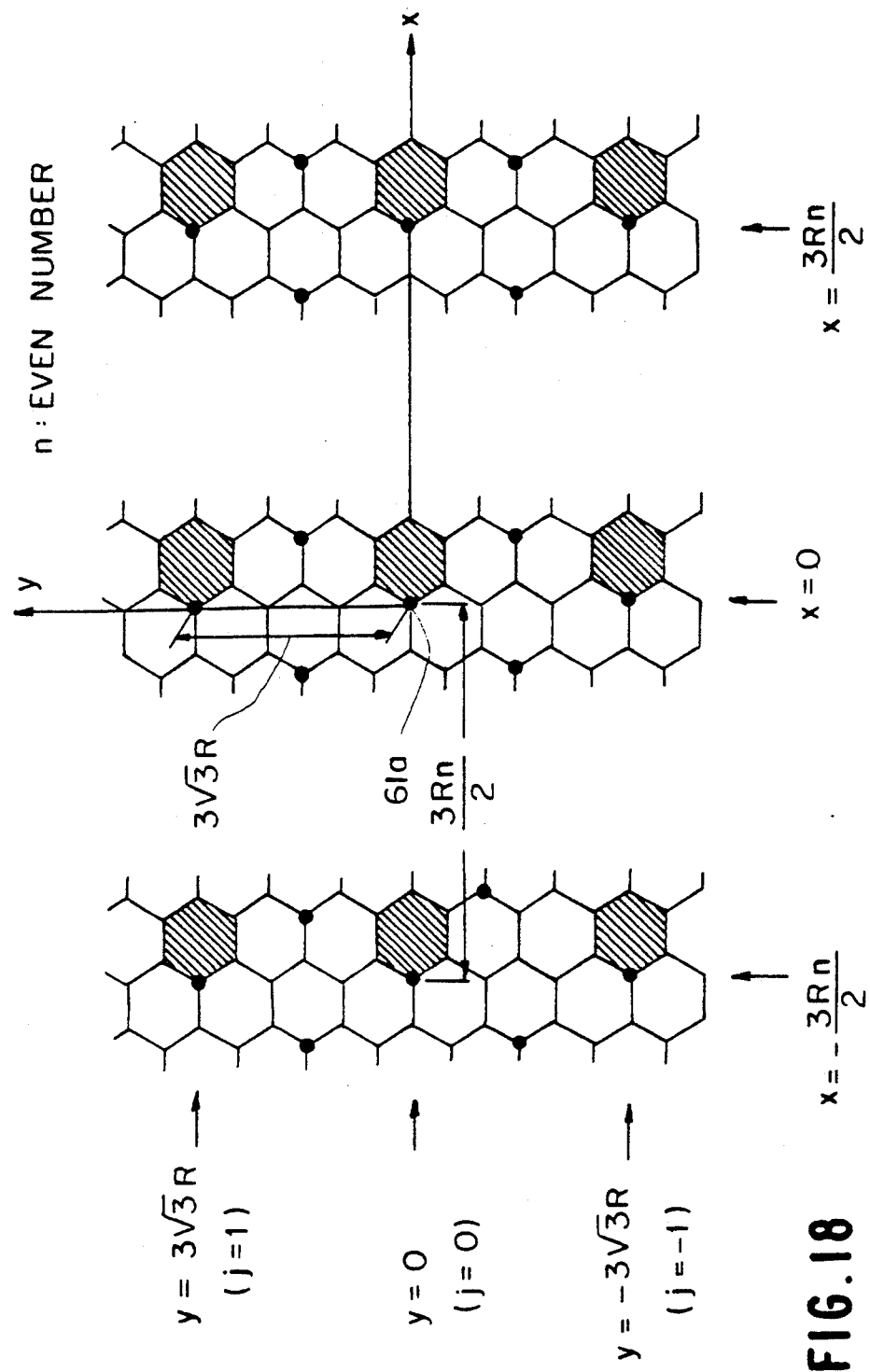
FIG. 18 is a schematic view for use in describing a principle of an antenna arrangement system according to a fifth embodiment of this invention.
Figure 19:
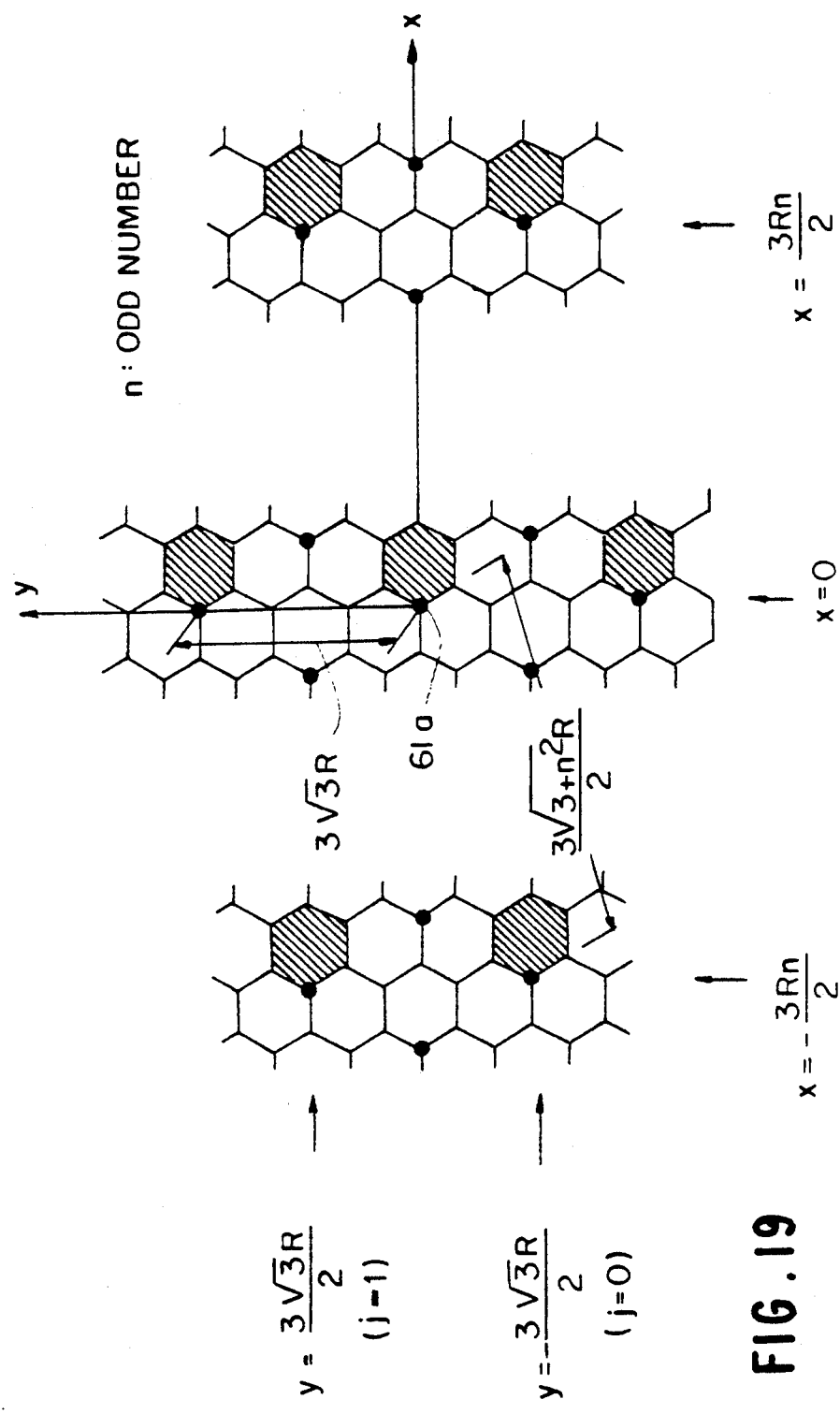
FIG. 19 is a similar view for use in describing another principle of the antenna arrangement according to the fifth embodiment of this invention.

Referring to FIGS. 18 and 19, description will be made about principles which are used in an antenna arrangement system according to a fifth embodiment of this invention. In FIGS. 18 and 19, radio base stations are represented by dots while sectors of each radio base station are represented by three regular hexagons shown around each dot, differing from the other figures. This shows that each radio base station has three directional antennae each of which has a radiation angle of 120 degrees. Three pairs of columns of cells alone are illustrated and are divided into a center pair, a righthand side pair, and a lefthand side pair each of which is in turn divided into a righthand side column and a lefthand side column. The righthand and the lefthand side pairs are spaced apart from the center pair by a distance which is variable in dependency upon a natureal number n, as will become clear.

In FIGS. 18 and 19, an orthogonal coordinate is defined like in the other figures and is specified by an origin, an x-axis extended from the origin, and a y-axis extended from the origin and orthogonal to the x-axis. The origin is located at a coordinate position of the radio base station which is located at a center of the center pair of columns and which is referred to as a reference base station depicted at 61a. The x-axis is extended rightwards of FIG. 18 in a positive direction while the y-axis is extended leftwards in a negative direction while the y-axis is extended from the origin and perpendicular to the x-axis.

In the antenna arrangement system illustrated in FIG. 18, the natural number n is an even number and the distance between the y-axis and each of the radio base stations arranged in the righthand and the lefthand side pairs of columns is determined by the even number n. In FIG. 18, the distance between the y-axis and the base tations of the righthand and the lefthand side pairs is equal to 3Rn/2, as shown in FIG. 18. It is assumed that an identical frequency channel is assigned to hatched sectors of the radio base stations which include the reference base station and is reused to the hatched sectors. The radio base stations which have the hatched sectors will be called channel reuse stations hereinunder. In the center pair of the columns, the channel reuse stations are placed along the y-axis with a space interval of $3\sqrt{3}$ R left therebetween.

In the antenna arrangement system, each of coordinate positions of the respective radio base stations can be represented by (3Ri/2, $3\sqrt{3}$ Rj) and (3Ri/2, $3\sqrt{3}$ R(2j−1)/2, where i is an even number and an odd number, respectively. In addition, the coordinate positions of the channel reuse stations are represented by (3Rni/2, $3\sqrt{3}$ Rj) where ni is an even number.

It is to be noted here that the hatched portions of the channel reuse stations are all directed towards the same direction, namely, an angle of 0 degree in FIG. 18.

On the other hand, when the natural number n is equal to an odd number, y-axis positions of the channel reuse stations in the center pair of columns are different from those of the channel reuse stations in each of the righthand and the lefthand side columns, as illustrated in FIG. 19, although each distance between the channel reuse stations arranged at the same x-axis positions along the y-axis is kept invariable and is equal to $3\sqrt{3}$ R. The coordinate positions of the channel reuse stations in the center pair are represented by (0, $3\sqrt{3}$ Rj) while the coordinate positions of the channel reuse stations in the righthand pair are represented by (3Rn/2, $3\sqrt{3}$ R/2) and (3Rn/2, $-3\sqrt{3}$ R/2), as illustrated in FIG. 19. As a result, the channel reuse stations in the lefthand pair are represented by (−3Rn/2, $3\sqrt{3}$ R/2) and (−3Rn/2, $-3\sqrt{3}$ R/2), as illustrated in FIG. 19. As a result, the coordinate positions of the channel reuse stations in each of the righthand and the lefthand pairs are generalized into (3 Rni/2, $3\sqrt{3}$ R(2j−1)/2) when ni is an odd number. With this structure, a minimum distance between the radio base stations along the x-axis becomes equal to $3\sqrt{(3+n^2)}$ R/2, as shown in FIG. 19.

In FIG. 19, it is noted that the hatch sectors /f the channel reuse stations are directed towards the angle of 0 along the x-axis, like in FIG. 18.

In any event, the co-channel interference is reduced with an increase of the nutural number n.

Figure 20:
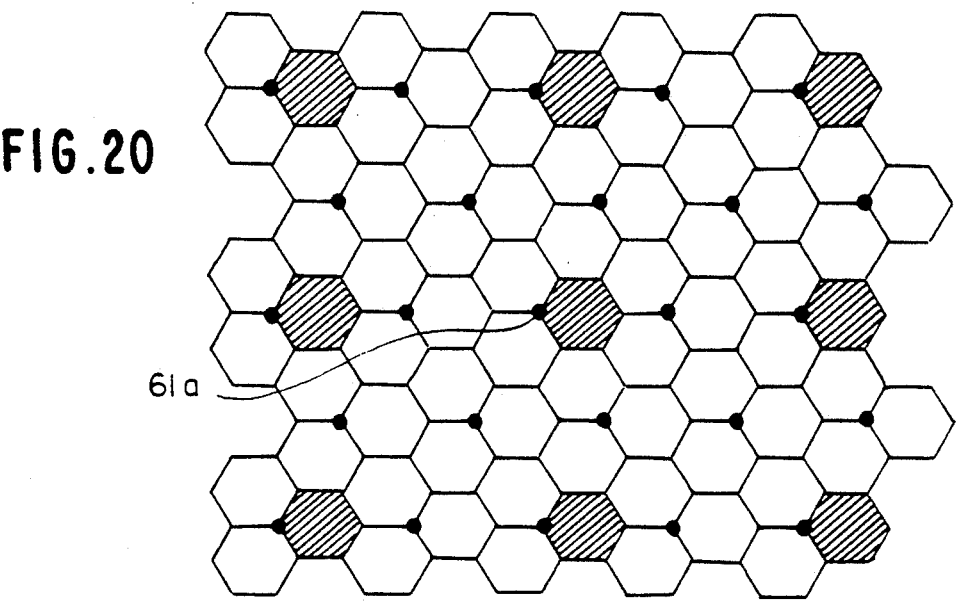
FIG. 20 is a schematic view for use in describing the antenna arrangement according to the fifth embodiment of this invention.

Referring to FIG. 20, the antenna arrangement system according to the fifth embodiment of this invention is based on the principles mentioned in conjunction with FIGS. 18 and 19 and has a repetition sector number equal to twelve. This shows that each cluster is formed by four of the radio base stations. With this structure, twelve different frequency channels are necessary at minimum to cover a whole of a service area.

Figure 21:
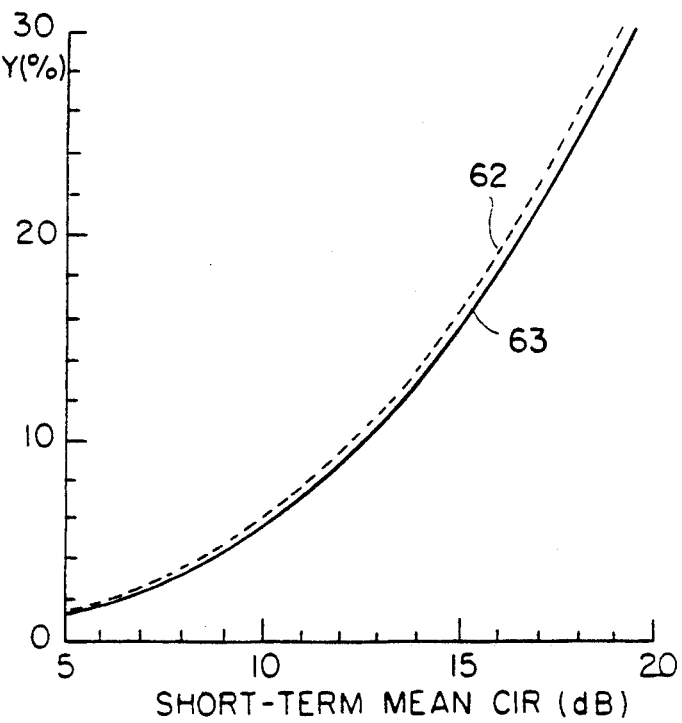
FIG. 21 is a graphical representation for use in describing the conventional system and the antenna arrangement system according to the fifth embodiment of this invention.

Referring to FIG. 21, the short-term mean CIR's are illustrated as characteristics of the parallel beam pattern system and the antenna arrangement system according to the fifth embodiment of this invention and are calculated in a manner similar to that illustrated in FIG. 6. In FIG. 21, curves 62 and 63 show the short-term mean CIR's of the parallel beam pattern system and this invention, respectively. When the curves 62 and 63 are compared with each other, it is found out that the short-term means CIR of this invention is improved by about 0.2 dB at the location probability of 10% in comparison with the parallel beam pattern system.

While this invention has thus far been described in conjunction with several embodiments thereof, it will readily be possible for those skilled in the art to put this invention into practice in various other manners. For example, even if the x-axis and the y-axis may be changed from one to another in the respective embodiments, such an antenna arrangement system is equivalent to those illustrated in the illustrated embodiments, as readily understood.

What is claimed is:

1. An antenna arrangement system for use in a cellular system which comprises a plurality of radio base stations dispersed in a service area which is defined by an orthogonal coordinate system having an x-axis extended from a negative direction towards a positive direction and a y-axis which is orthogonal to the x-axis and which is also extended from a negative direction towards a positive direction, the radio base stations having cells approximately specified by regular hexagonal configurations, respectively, and being located at x- and y-axis positions which are specified by i, j, and r, where i and j are integers determined along the x- and the y-axes, respectively, and R is representative of a length of each side of the regular hexagonal configurations, the x- and the y-axis positions of the respective radio base stations being given by:

$$x = \sqrt{3}\ Ri,\ \text{(when } j \text{ is an even number) or}$$
$$\phantom{x =\ } \sqrt{3}\ R(2i-1)/2\ \text{(when } j \text{ is an odd number), and}$$
$$y = 3Rj/2,$$

each of said radio base stations having a set of six directional antennae which have different frequency channels assigned thereto and including a first antenna which has directivity directed towards an angle of 0 degrees with respect to the positive direction of a selected one of the x- and y-axes and a second antenna which has directivity directed towards an angle of 180 degrees with respect to the positive direction of the selected one of the x- and the y-axes, the plurality of the radio base stations including first and second selected base stations which have sectors determined by the first and the second antennae directed towards the angles of 0 and 180 degrees opposite to each other, respectively, and which have a common one of the frequency channels that is assigned to the sectors which are determined by the first and the second antennae and which are laid in directions of the angles of 0 and 180 degrees relative to the selected one of the x- and y-axes, the first and the second selected base stations being located in said coordinate system at the first and the second coordinate positions specified by an even number and an odd number of j, respectively, the selected one of the x- and the y-axes being the x-axis, the first coordinate positions being given by ($\sqrt{3}$ RnK, 3Rj/2) where j takes an even number; n, a natural number; and k, an integer, while the second coordinate positions are given by $\sqrt{3}$ R(2nk−1)/2, 3Rj/2 where j takes an odd number.

2. An antenna arrangement system for use in a cellular system which comprises a plurality of radio base stations dispersed in a service area which is defined by an orthogonal coordinate system having an x-axis extended from a negative direction towards a positive direction and a y-axis which is orthogonal to the x-axis and which is also extended from a negative direction towards a positive direction, the radio base stations having cells approximately specified by regular hexagonal configurations, respectively, and being located at x- and y-axis positions which are specified by i, j, and R, where i and j are integers determined along the x- and the y-axes, respectively, and R is representative of a length of each side of the regular hexagonal configurations, the x- and the y-axis positions of the respective radio base stations being given by:

$x = \sqrt{3}\, Ri,$ (when $j$ is an even number) or $\sqrt{3}\, R(2i-1)/2$ (when $j$ is an odd number), and $y = 3Rj/2,$ each of said radio base stations having a set of six directional antennae which have different frequency channels assigned thereto and including a first antenna which has directivity directed towards an angle of 0 degrees with respect to the positive direction of a selected one of the x- and the y-axes and a second antenna which has directivity directed towards an angle of 180 degrees with respect to the positive direction of the selected one of the x- and the y-axes, the plurlity of the radio base stations including first and second selected base stations which have sectors determined by the first antenna of the first selected base station and the second antenna of the second selected base station directed towards the angles of 0 and 180 degrees opposite to each other, respectively, and which have a common one of the frequency channels that is assigned to the sectors which are determined by the first and the second antennae and which are laid in directions of the angles of 0 and 180 degrees relative to the selected one of the x- and y-axes, the first and the second selected base stations being located in said coordinate system at the first and the second coordinate positions specified by an even number and an odd number of j, respectively, the selected one of the x- and the y-axes being the x-axis, the first coordinate positions being given by ($\sqrt{3}\, Rnk$, $3Rj/2$) where j takes an even number, k is an integer, and n is a natural number while the second coordinate positions are given by ($\sqrt{3}R(2nk-3)/2$), $3Rj/2$ where j takes an odd number, k is an integer and n is a natural number.

3. An antenna arrangement system for use in a cellular system which comprises a plurality of radio base stations dispersed in a service area which is defined by an orthogonal coordinate system having an x-axis extended from a negative direction towards a positive direction, and a y-axis which is orthogonal to the x-axis and which is also extended from a negative direction towards a positive direction, the radio base stations having cells approximately specified by regular hexagonal configurations, respectively, and being located at x- and y-axis positions which are specified by i, j, and R, where i and j are integers determined along the x- and y-axes, respectively, and R is representative of a length of each side of the regular hexagonal configurations, the x- and the y-axis positions of the respective radio base stations being given by:

$x = 3Ri/2,$ and $y = \sqrt{3}\, Rj$ (when $i$ is an even number) and $\sqrt{3}\, R(2j-1)/2$ (when $i$ is an odd number), each of said radio base stations having a set of six directional antennae which have different frequency channels assigned thereto and including a first antenna which has directivity directed towards an angle of 0 degrees with respect to the positive direction of the x-axis and a second antenna which has directivity directed towards an angle of 180 degrees with respect to the positive direction of the x-axis, the plurality of the radio base stations including first and second selected base stations which have sectors determined by the first antenna of the first selected base station and the second antenna of the second selected base station directed towards the angles of 0 and 180 degrees opposite to each other, respectively, and which have a common one of the frequency channels that is assigned to the sectors which are determined by the first and the second antennae and which are laid in directions of the angles of 0 and 180 degrees relative to the x-axis, the first and the second selected base stations being located in said coordinate system at the first and the second coordinate positions specified by an even number and an odd number of j, respectively, the first coordinate positions being given by (0, $\sqrt{3}Rj$) where j is an integer while the second coordinate positions are given by ($-3R/2$, $\sqrt{3}(2j-1)/2$).

* * * * *

UNITED STATES PATENT AND TRADEMARK OFFICE
CERTIFICATE OF CORRECTION

PATENT NO. : 5,307,507

DATED : April 26, 1994

INVENTOR(S) : Toshihito KANAI

It is certified that error appears in the above-identified patent and that said Letters Patent is hereby corrected as shown below:

Col. 3, line 4, delete "7hich" and insert --which--.

Col. 5, line 9, delete "premble" and insert --preamble--.

Col. 6, line 4, delete "position" and insert --positive--.

Col. 10, line 6, delete "&irst" and insert --first--;

Col. 10, line 11, delete "showing" and insert --shown--.

Col. 12, line 53, delete "natureal" and insert --natural--.

Col. 13, line 5, delete "tations" and insert --stations--;

Col. 13, line 37, after "(3 Rn/2," insert -- $-3\sqrt{3}$ R/2). Likewise, the coordinate positions of the channel reuse stations in the lefthand pair are represented by (-3 Rn/2, 3 $\sqrt{3}$ R/2) and (-3 Rn/2--;

Col. 13, line 47, delete "/f" and insert --of--;

Col. 13, line 51, delete "nutural" and insert --natural--.

UNITED STATES PATENT AND TRADEMARK OFFICE
CERTIFICATE OF CORRECTION

PATENT NO. : 5,307,507
DATED : April 26, 1994
INVENTOR(S) : Toshihito Kanai

It is certified that error appears in the above-indentified patent and that said Letters Patent is hereby corrected as shown below:

Column 15, line 32, delete "plurlity" and insert --plurality--.

Signed and Sealed this

Twenty-seventh Day of September, 1994

Attest:

BRUCE LEHMAN

Attesting Officer

Commissioner of Patents and Trademarks